(12) United States Patent
Ormiston

(10) Patent No.: US 11,907,787 B2
(45) Date of Patent: Feb. 20, 2024

(54) DUAL INTERFACE METALLIC TRANSACTION CARDS AND METHODS OF MANUFACTURING THE SAME

(71) Applicant: ANOMATIC CORPORATION, New Albany, OH (US)

(72) Inventor: Mark A. Ormiston, Hebron, OH (US)

(73) Assignee: ANOMATIC CORPORATION, New Albany, OH (US)

( * ) Notice: Subject to any disclaimer, the term of this patent is extended or adjusted under 35 U.S.C. 154(b) by 0 days.

(21) Appl. No.: 17/660,248

(22) Filed: Apr. 22, 2022

(65) Prior Publication Data

US 2023/0281420 A1    Sep. 7, 2023

Related U.S. Application Data

(60) Provisional application No. 63/268,729, filed on Mar. 1, 2022.

(51) Int. Cl.
*G06K 19/077* (2006.01)
*G06K 19/04* (2006.01)
*G06K 19/02* (2006.01)

(52) U.S. Cl.
CPC ..... *G06K 19/07722* (2013.01); *G06K 19/044* (2013.01); *G06K 19/045* (2013.01); *G06K 19/07754* (2013.01); *G06K 19/07769* (2013.01)

(58) Field of Classification Search
CPC .......... G06K 19/07722; G06K 19/044; G06K 19/045; G06K 19/07754; G06K 19/07769; G06K 19/06206; H01F 41/16; H01F 27/366; H01F 1/06; B05D 1/02; B05D 7/06; B05D 3/207; B05D 5/06; B05D 2203/20; B41M 5/0076; B41M 3/14

See application file for complete search history.

(56) References Cited

U.S. PATENT DOCUMENTS

| | | |
|---|---|---|
| 7,494,057 B2 | 2/2009 | Lasch et al. |
| 7,581,308 B2 | 9/2009 | Finn |
| 7,979,975 B2 | 7/2011 | Finn |
| 7,980,477 B2 | 7/2011 | Finn |
| 8,240,022 B2 | 8/2012 | Finn |
| 8,393,547 B2 | 3/2013 | Kiekhaefer et al. |
| 8,857,722 B2 | 10/2014 | Mosteller |
| 8,991,712 B2 | 3/2015 | Finn et al. |
| 9,033,250 B2 | 5/2015 | Finn et al. |
| 9,053,404 B2 | 6/2015 | Finn |

(Continued)

FOREIGN PATENT DOCUMENTS

| | | | |
|---|---|---|---|
| IN | 202021025130 A | | 1/2022 |
| JP | H1139444 A | * | 2/1999 |
| JP | 2003094866 A | * | 4/2003 |

OTHER PUBLICATIONS

Walsh, "Electrode Reactions in Metal Finishing" (Year: 1991).*

(Continued)

*Primary Examiner* — Thien T Mai
(74) *Attorney, Agent, or Firm* — Vorys, Sater, Seymour and Pease LLP; Mark A. Watkins

(57) ABSTRACT

A dual interface transaction card for contact and contactless transactions including an anodized top metal layer. The arrangement of layers allowing for high conductivity metals such as aluminum to be used without compromising the contactless function of the card.

10 Claims, 7 Drawing Sheets

(56) References Cited

U.S. PATENT DOCUMENTS

| | | |
|---|---|---|
| 9,104,955 B2 | 8/2015 | Finn |
| 9,112,272 B2 | 8/2015 | Finn et al. |
| 9,195,932 B2 | 11/2015 | Finn et al. |
| 9,242,436 B1 | 1/2016 | Hallman et al. |
| 9,272,370 B2 | 3/2016 | Finn et al. |
| 9,489,613 B2 | 11/2016 | Finn et al. |
| 9,622,359 B2 | 4/2017 | Finn et al. |
| 9,633,304 B2 | 4/2017 | Finn et al. |
| 9,634,391 B2 | 4/2017 | Finn et al. |
| 9,836,684 B2 | 12/2017 | Finn et al. |
| 10,193,211 B2 | 1/2019 | Finn et al. |
| 10,518,518 B2 | 12/2019 | Finn et al. |
| 10,599,972 B2 | 3/2020 | Finn et al. |
| 10,762,413 B2 | 9/2020 | Finn et al. |
| 10,839,282 B2 | 11/2020 | Finn et al. |
| 10,867,235 B2 | 12/2020 | Finn |
| 10,977,542 B2 | 4/2021 | Lotya et al. |
| 11,182,655 B2 | 11/2021 | Ormiston |
| 2014/0209691 A1* | 7/2014 | Finn .................. H01F 27/363 235/492 |
| 2021/0049431 A1 | 2/2021 | Lotya |
| 2021/0056375 A1 | 2/2021 | Lotya et al. |
| 2021/0192312 A1 | 6/2021 | Lotya et al. |

OTHER PUBLICATIONS

Wayken, "Metal Strength: A Basic Guide And Chart" (Year: 2021).*
Yang et al. "Pulsed eddy-current measurement of a conducting coating on a magnetic metal plate" (Year: 2002).*
International Search Report and Written Opinion dated Oct. 17, 2023, for PCT/US2023/019954, 8 pages.

* cited by examiner

DUAL INTERFACE METALLIC TRANSACTION CARDS AND METHODS OF MANUFACTURING THE SAME

This application claims priority benefit of U.S. Provisional Patent Application Ser. No. 63/268,729 filed Mar. 1, 2022, entitled "Dual Interface Metallic Transaction Cards and Methods of Manufacturing the Same," the complete disclosure of which, in its entirety is herein incorporated by reference.

BACKGROUND

Transaction cards are prevalent throughout modern society. Transaction cards may include various cards, including debit cards, credit cards, identification cards, loyalty cards, membership cards, healthcare cards, security cards, etc. Transaction cards thus include various types of information, including identification information, demographic information, financial or account information. Transaction cards may store this information in a variety of ways, including via utilization of magnetic stripes, radio frequency identification chips, etc. Transaction cards may be customized. Thus, companies may customize transaction cards to include graphic images, designs, photographs, etc. In addition, transaction cards may have security features, such as a diffraction grating or holographic image. International standards exist and prescribe physical dimensions and other features of transaction cards. Transaction cards' physical dimensions, features, and embossing area are set forth in the International Standards Organization ("ISO") 7810 and others, such as ISO 7811.

Transaction card are commonly made from thermoplastic materials, such as polyvinyl chloride ("PVC") and polyethylene terephthalate ("PET"). Traditionally, these transaction cards are manufactured as laminates and thus, include a plurality of thermoplastic layers. However, these thermoplastic transaction cards are susceptible to being damaged or destroyed if exposed to certain environments. For example, moisture and/or sunlight may break down the chemical bonds within the polymers of such transaction cards such that transaction cards left exposed to moisture and sunlight may become warped, cracked and unusable. In addition, thermoplastic transaction cards may be easily bent, may be broken, or may be cut, thereby damaging the transaction card and rendering it unusable.

More recently, transaction cards have been made from metals. These metallic transaction cards are stronger and more durable than those made from thermoplastic materials and may withstand exposure to the elements, such as moisture or sunlight. However, these metallic transaction cards are more difficult and expensive to manufacture. Known methods for overcoming these shortcomings may result in metallic credit cards that are prohibitively expensive.

Transaction card technology is also embracing contactless payment methods that utilities radio-frequency identification (RFID) or near field communication (NFC) for making secure payments. The card typically includes an integrated chip and antenna that enable cardholders to waive the contactless card in close proximity to a card reader to complete a transaction. There are current difficulties in manufacturing metal contactless cards as the metal material in the card has an impact on the ability for the card to be read. The difficulties increase with high-conductivity metals such as aluminum, as the high conductivity inhibits the reception of the RF energy to activate the chip within the card.

Therefore, a need exists for manufacturing aesthetically pleasing metallic transaction cards in a cost effective manner and from suitable low-cost metals. A further need exists for incorporating various transaction card features into these transaction cards and ensuring sufficient functionality.

SUMMARY

Various details of the present disclosure are hereinafter summarized to provide a basic understanding. This summary is not an extensive overview of the disclosure and is neither intended to identify certain elements of the disclosure, nor to delineate the scope thereof. Rather, the primary purpose of this summary is to present some concepts of the disclosure in a simplified form prior to the more detailed description that is presented hereinafter.

According to some aspects of the present disclosure, a transaction card includes a card body made from a stack of various layers. The card body of the transaction card may include a top layer made from high tensile and yield strength material such as metal. In some embodiments, the top layer is an anodized metal, such as anodized aluminum. The card body may also include adhesive layers, a magnetic layer for shielding an antenna, an antenna platform including at least one antenna overlay, a thermoplastic layer, and an overlay layer.

In some exemplary embodiment, the transaction card includes a card body having a top metal layer, a magnetic layer, an antenna package layer, and a thermoplastic layer. In a further embodiment, the transaction card further includes a thermoplastic perimeter layer surrounding the magnetic layer. In another further embodiment, the transaction card further includes a magnetic platform comprising the magnetic layer sandwiched between two adhesive layers. In another further embodiment, the antenna package layer includes an antenna layer sandwiched between two thermoplastic overlay layers. In another further embodiment, the metal layer has a conductivity greater than 10 million Siemens/meter. In another further embodiment the metal layer is aluminum. In another further embodiment the metal layer has a yield strength between 40 and 60 ksi. In another further embodiment, the transaction card further includes a chip module in electronic communication with the antenna layer and configured to receive an activating radio frequency energy.

In accordance with another aspect of the present disclosure a method for manufacturing one or more transaction cards is described. The method includes providing metal top layer, a magnetic platform sheet, an antenna package sheet, the antenna package sheet containing at least one antenna, and a thermoplastic sheet. The method also includes aligning the metal top layer, magnetic platform sheet, antenna package, and thermoplastic sheet to create an aligned stack of sheets. The method also includes, laminating the aligned stack of sheets with a combination of heat and pressure and removing at least one transaction card body from the laminated stack of sheets. In a further embodiment, removing at least one transaction card body includes milling a transaction card from the laminated stack of sheets. In another further embodiment, removing at least one transaction card body includes milling at least one pocket configured to receive a chip module. In another further embodiment, removing at least one transaction card body comprising inserting a chip module into the at least one milled pocket. In another further embodiment the magnetic platform sheet comprises a thermoplastic skeleton sheet with at least one card shaped cutout and a magnetic card inserted into the card shaped cutout. In another further embodiment, the magnetic card is made of ferrite. In another further embodiment, the metal layer has a conductivity greater than 10 million Siemens/meter. In another further embodiment, the metal layer is aluminum. In another further embodiment, the metal layer has a yield strength between 40 and 60 ksi. In another further embodiment the method further includes providing a chip module in electronic communication with the antenna layer and the chip module configured to receive an activating radio frequency energy

BRIEF DESCRIPTION OF THE DRAWINGS

The following figures are included to illustrate certain aspects of the present disclosure and should not be viewed as exclusive embodiments. The subject matter disclosed is capable of considerable modifications, alterations, combinations, and equivalents in form and function, without departing from the scope of this disclosure.

DETAILED DESCRIPTION

Figure 1:
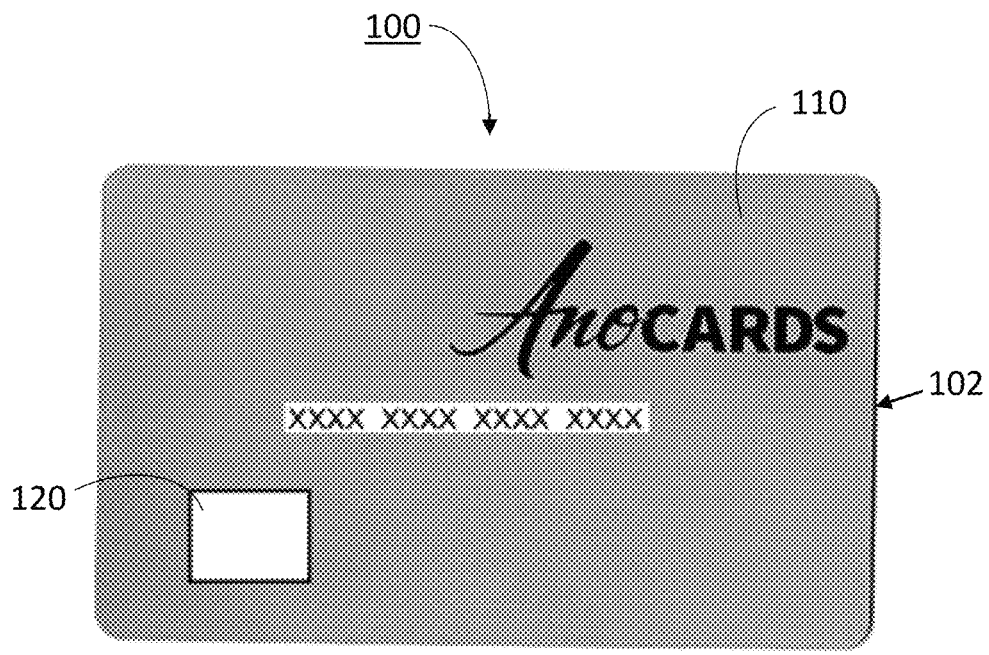
FIG. 1 is a front view of an exemplary transaction card that may incorporate the principles of the present disclosure.

A more complete understanding of the components, processes and apparatuses disclosed herein can be obtained by reference to the accompanying drawings. These figures are merely schematic representations based on convenience and the ease of demonstrating the present disclosure, and are therefore not intended to indicate relative size and dimensions of the devices or components thereof and/or to define or limit the scope of the exemplary embodiments.

Although specific terms are used in the following description for the sake of clarity, these terms are intended to refer only to the particular structure of the embodiments selected for illustration in the drawings and are not intended to define or limit the scope of the disclosure. In the drawings and the following description below, it is to be understood that like numeric designations refer to components of like function.

Transaction cards and methods of making metallic transaction cards are disclosed herein. Transaction cards according to the examples disclosed herein have better mechanical properties than currently existing cards and have a more aesthetically pleasing appearance than such currently existing cards. The presently disclosed methods of forming transaction cards with such improved mechanical and aesthetic properties result in significant cost savings as the presently disclosed transaction cards may be significantly less expensive to manufacture (e.g., up to 75% less expensive). Transaction cards may include various types of cards, including luggage tags, identification cards, loyalty cards, gift cards, contact transaction cards (e.g., credit card having magnetic stripes, bar codes, and/or chips), and contactless transaction cards (e.g., credit cards having radio-frequency identification ("RFID") antenna chip). Depending on the ultimate end-use of the transaction card, it may include one or more information storing features and/or security features (hereinafter, collectively referred to as "features"). In one or more examples, the transaction cards disclosed herein FIG. 1 is a front view of an example transaction card 100 that may incorporate the principles of the present disclosure. The depicted transaction card 100 is just one example transaction card that can suitably incorporate the principles of the present disclosure. Indeed, many alternative designs and configurations of the transaction card 100 may be employed, without departing from the scope of this disclosure.

The transaction cards 100 disclosed herein may include a card body (or card form) 102. The card body 102 may be manufactured from various materials and/or a combination of various materials. As described below, the card body 102 may include aluminum or other metals. In some embodiments, the transaction card 100 may also include one or more "overlays" (not illustrated) arranged on the card body 102. Thus, the transaction card 100 may be comprised of two (2) or more layers; though, in some embodiments, the transaction card 100 includes the card body 102 without any overlays. Where utilized, overlays may be adhered to the card body 102 via adhesive or lamination. In some examples, the card body 102 is sandwiched between a front overlay and a rear overlay. In other embodiments, either a front overlay or a rear overlay is arranged on the card body 102. Overlays may be made from various thermoplastic materials, including without limitation, PVC or PET. In addition, overlays may integrally include various features or such features may be applied thereon, as detailed below.

The transaction card 100 includes a front face 110. As mentioned above, the transaction card 100 may include one or more front overlays and, in such embodiments, the front overlay(s) will define at least a portion of the front face 110. The front surface 110 of the transaction card 100 may include various features. In some examples, the features may include indicia, such as images, graphics, words, account numbers, or other symbols. As illustrated in FIG. 1, the indicia may be provided on the front face 110 of the transaction card 100, and it may be provided in a variety of techniques. For example, indicia may be printed on the front face 110 (or printed onto a front overlay applied on the front face 110) using conventional printing techniques, such as holographic printing, or the indicia may be laser etched or printed onto the card body 102 and/or the front overlay. In some embodiments, indicia is provided on an overlay that is adhered to the card body 102. Moreover, in embodiments where the transaction card 100 is a payment card (e.g., credit or debit card), the transaction card 100 may also include a chip-enabled card acceptance ("EMV") chip or chip module 120. In some embodiments, the chip module 120 is exposed through a window in the front face 110. Thus, a surface makes contact with a reader to enable a transaction ("contact transaction") In other embodiments, the chip module 120 is an RFID antenna chip and/or is in electronic communication with an RFID antenna provided in the card body 102. This allows the card to be read simply by being in close proximity to a card reader. For example, a card reader may provide an radio signal which activates the chip. In yet still other embodiments, the chip module 120 may be read via both contact and contactless means, either as a single chip or as multiple chips.

Figure 2:
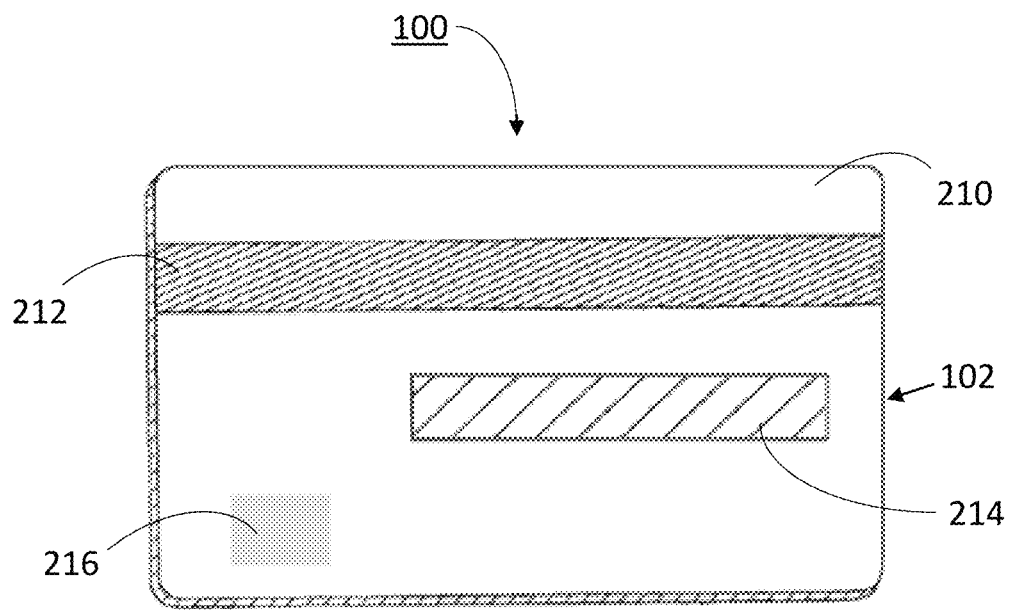
FIG. 2 is a back view of an exemplary transaction card in accordance with one or more embodiments of the present disclosure.

FIG. 2 illustrates an exemplary rear face 210 of the transaction card 100 of FIG. 1 that may incorporate the principles of the present disclosure. As mentioned above, the transaction card 100 may include one or more rear overlays and, in such embodiments, the rear overlay(s) will define at least a portion of the rear face 210. The rear face 210 may also include features. In the illustrated example, the rear face 210 includes a number of features, including a magnetic stripe 212, a signature panel 214, and a hologram 216. Also in the illustrated example, the chip module 120 is installed within a pocket or recess (obscured from view) formed into the rear face 210 that is in communication with the window on the front face 110, and covered with a laminate such that the chip module 120 is obscured from view when viewing the rear face 210 as illustrated in FIG. 2. Thus, in the illustrated embodiment, the chip module 120 is embedded into the transaction card 100 and viewable only through the window formed in the front face 110. Also, the transaction card 100 may also include a bar code on the front face 110 and/or the rear face 210, and such bar code may be provided in addition to any of the foregoing features or in lieu of any of the same, for example, it may be provided in addition to or instead of the magnetic stripe 212.

The foregoing features illustrated in FIGS. 1-2 (or other such features) may be attached to the transaction card 100 in a variety of techniques. As to the chip module 120, it may be adhered within a milled pocket as detailed below or it may be incorporated into a layer of the transaction card 100. As to the magnetic stripe 212, it may be adhered directly to the transaction card 100, for example, within a milled slot as detailed below. Alternatively, the magnetic stripe 212 may be topically applied. For example, the magnetic stripe 212 may be integrally included in a rear overlay that is laminated to the card body 102, such that the magnetic stripe 212 is laminated onto the card body 102, or an overlay may be laminated to the card body 102 and then the magnetic stripe 212 topically adhered to the overlay. The signature panel 214, where included, may also be topically applied to the transaction card 100 (in the same manner as described with regard to the magnetic stripe 212) via the same overlay as the magnetic stripe 212 or via a separate overlay. Similarly, the hologram 216, where included, may be topically applied to the transaction card 100 (in the same manner as described with regard to the magnetic stripe 212 and/or the signature panel 214) via the same overlay or via a separate overlay. Thus, for example, the magnetic stripe 212, the signature panel 214, and the hologram 216 (and other features) may all be integral with a single overlay (or topically adhered to a single overlay), or they may each be integral with their own separate overlay (or topically adhered to their own unique overlay), or any combination thereof. In other examples, at least two of the magnetic stripe 212, the signature panel 214, and the hologram 216 (and other features) are integrally included in the same overlay (or topically adhered to the same overlay) and the remaining feature(s) is (are) integrally included in a separate overlay (or topically adhered to a separate overlay). Thus, the features may be applied via a single laminated overlay or via two (2) or more separate laminated overlays.

The transaction cards 100 disclosed herein may have various geometries and dimensions, as may be required of a particular end-use application. In some embodiments, the transaction cards 100 disclosed herein conform to the dimensions set forth in ISO 7810. Thus, the thickness of the transaction cards 100 may be in the range of 0.027 inches to 0.033 inches thick. This range of thicknesses will ensure that the transaction cards 100 fit through card reader devices (not illustrated), and will ensure that the information stored on the transaction card 100 (e.g., information stored in the magnetic stripe 212, chip module 120, etc.) is readable by the card reader devices. In some embodiments, transaction cards 100 disclosed herein are provided with thickness at the upper end of the foregoing range of thicknesses, for example, 0.030 to 0.033 inches. The transaction cards 100 having thicknesses within this upper range of thicknesses will have as much mass possible while still being able to pass through a card reading device, therefore making them suitable as premium edition transaction cards (e.g., high-limit credit cards, luxury hotel loyalty cards, etc.). In other embodiments, transaction cards 100 provided herein may include thicknesses and/or one or more other dimensions that are different from those provided in ISO 7810.

The transaction cards 100 disclosed herein may be manufactured from various materials and combinations of various materials. In particular, the card body 102 may include a metallic material, such as aluminum, tungsten, steel, titanium, etc. Transaction cards 100 made from such metallic materials are generally stronger and more durable than those made primarily from thermoplastic materials. In more particular embodiments, transaction cards disclosed herein are made with anodized aluminum. In addition, transaction cards 100 made with metals or metal alloys may inhibit skimming of sensitive data from the transaction card's chip module 120 via RFID scanning. This is because the metal provides a blocking effect or may dissipate RFID signals, thereby making it difficult to excite the chip from a distance without a high power transmitter. This phenomenon is exaggerated in metals with higher conductivity. Steel with a relatively low conductivity of about 6 million Siemens/meter does not have the blocking power of aluminum with a conductivity of 38 million Siemens/meter. Said another way, aluminum as a metal layer inhibits reception of the RF energy required to excite the chip module 120. The configurations of the layers stacks disclosed herein address the difficulties with high conductivity metals (having a conductivity greater than 10 million Siemens/meter) and allow contactless transaction cards to function as expected. In some embodiments, a user may be required to present the side of the card 100 opposite the metal layer 302 towards a card reader to ensure that sufficient RF energy is received by the carried chip module 120.

Moreover, a chip module 120 embodied as an RFID antenna chip in the transaction cards 100 disclosed herein may be grounded when installed within the transaction cards 100, which thereby impairs excitation of the RFID antenna chip by skimming devices, which in turn inhibits skimming of the transaction card 100.

Figure 3:
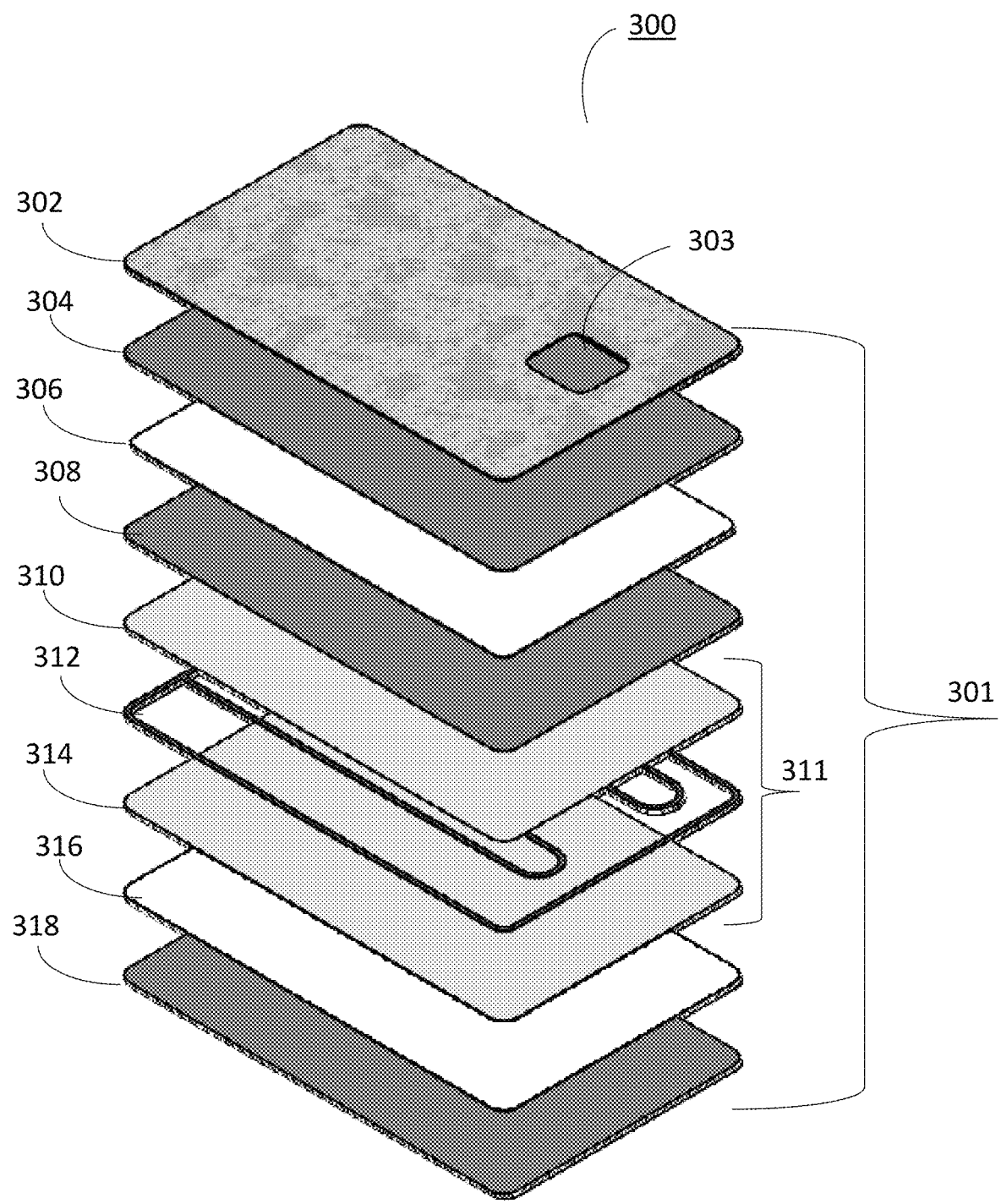
FIG. 3 is an exploded view of an exemplary transaction card in accordance with one or more embodiments of the present disclosure.

FIG. 3 illustrates an exploded view of an exemplary card 300, similar in many respects to the card 100. As illustrated, the card 300 includes a card body 301 made from a stack of various layers (302-318). In the exemplary embodiment, the card body 301 of the transaction card 300 includes a top layer 302 made from high tensile and yield strength material such as metal. Metals suitable as the top later 302 include but are not limited to aluminum, tungsten, steel, titanium and alloys thereof. In some particular embodiments, the top layer 302 is an anodized metal, such as anodized aluminum. Aluminum may have certain advantages as it is lighter in weight when compared to steel, titanium, and tungsten while having sufficient durability and yield strength. While having desirable properties, the higher conductivity of aluminum presents certain challenges for contactless transactions. The card body 301 may also include adhesive layers such as layers 304 and 308, a magnetic layer 306, an antenna 312, antenna overlays 310 and 314, a thermoplastic layer 316, and at least one overlay layer 318, each layer described in greater detail below.

The metal top layer 302 may range from about 0.1 to about 0.5 mm in thickness. In some further embodiments, the metal top layer may have a thickness ranging from about 0.2 to about 0.3 mm. In yet still further embodiments; the thickness of the metal top layer 302 may range from about 0.25 to about 0.275 mm.

The metal top layer 302 may also include a cutout portion (pocket) 303, configured to receive an information device such as chip module 120. The cutout portion may be created by means known in the art, including milling, laser cutting, die cutting, and the like. The chip module 120 may be adhered within the cutout portion 303.

The metal of the top layer 302 may impart certain desirable physical characteristics to the card body 302. For example, the transaction card 300 may be formed to have a minimum yield strength of at least about forty (40) kilopounds per square inch ("ksi"). Transaction cards 300 with this yield strength resist deformation after flexing, remaining flat. The transaction cards 300 may be provided with a lower minimum yield strength, however, without departing from the present disclosure. In addition, the transaction cards 300 may be provided with various maximum yield strength, where the maximum yield strength is dependent upon how much flex resistance of the card body 301 is desired or needed for a particular end use application. For example, the card body 301 may have a yield strength of below about seventy-three (73) ksi, such that it is not too brittle that it would break or fracture when in a user's wallet after repeated flexing. In several examples, the transaction card 300 is formed with a yield strength of between about forty (40) to sixty (60) ksi.

Various aluminum alloys may be utilized to form the top layer 302 of card body 301 with appropriate tensile and yield strengths, including but not limited to 5000 series, 6000 series, or 7000 series Aluminum. For example, a 5000 series aluminum may be utilized, including but not limited to AA 5056, AA 5052, AA 5182, etc. Where utilized, these or other 5000 series aluminum alloys may be work-hardened during the rolling process. In addition, the 5000 series alloys may have various tempers, including but not limited to H18 temper designation, H19 temper designation, H26 temper designation, H34 temper designation, H39 temper designation, etc. In some examples, the top layer 302 is formed from AA 5182 Hxx, and in some of these examples, the AA 5182 alloy has a temper designation of H18.5000 series Aluminum may include AA 5182 Hxx, AA 5052 Hxx, AA 5056 Hxx variations. Aluminum AA 5182 Hxx is a wrought alloy with good corrosion resistance and favorable weldability characteristics. Instead of being subject to heat treatment, this alloy is work hardened (e.g., in either in the rolling or forming operations) to achieve the appropriate tensile properties. Thus, utilizing work hardened (or cold hardened) Aluminum AA 5182 Hxx may provide the transaction card 300 with high tensile strength and yield strength without heat treatment. In one example, Aluminum AA 5182 H18 is rolled to high minimum yield strength of about fifty (50) ksi, which provides the transaction card 300 with the appropriate tensile properties needed to prevent it from bending when stored in a wallet. In addition, Aluminum AA 5182 Hxx is abundant in supply and significantly less expensive than Aluminum AA 6061 because, unlike the latter, the former is not subject to heat treatment. Moreover, Aluminum AA 5182 Hxx has better aesthetic properties (i.e., gloss level and smooth finish) as compared to Aluminum AA 6061. For example, AA 5182 has a brighter mill finish before anodizing such that less polishing is subsequently needed and is brighter in anodizing than the AA 6061 Aluminum. Thus, manufacturing the transaction card 100 with Aluminum AA 5182 Hxx may be more economical to produce and provide the transaction card 300 with a brighter and "cleaner" finish, as compared to transaction cards produced from 6061 Aluminum.

6000 series Aluminum may be utilized within the top layer 302. Various alloys in this series may be utilized, including but not limited to AA 6061 Aluminum. Where utilized, the 6000 series Aluminum may have various tempers, including but not limited to T4 temper designation or T6 temper designation. In one example, AA 6061-T6 Aluminum may be utilized. Aluminum AA 6061-T6 is high strength and heat-treated alloy, and may provide the card body 301 with a yield strength of about forty (40) to forty-two (42) ksi. This alloy is subject to thermal tempering to provide it with the requisite strength, which thereby makes it relatively expensive as compared to 5000 series Aluminum such as Aluminum AA 5182 Hxx. The Aluminum AA 6061-T6 alloy also includes Iron and Silicon, which provides it with a more "industrial" appearance that is not as bright or "clean" as compared to Aluminum AA 5182 Hxx. Depending on the particular end-use application of the transaction card 300, the "industrial" appearance may or may not be desirable. In examples where the card body 302 is formed from a 7000 series Aluminum alloy, various such allows may be utilized, including but not limited to AA 7075, AA 7351, AA 7072, AA 7475, etc. Where utilized, the 7000 series Aluminum may have various tempers, including but not limited to T4 temper designation or T6 temper designation. In one example, AA 7075-T6 Aluminum is utilized and provides the transaction card 300 with a yield strength of about seventy-three (73) ksi.

The card body 302 also includes a magnetic layer 306 located between the metal top layer and bottom overlay layer 318. In some further embodiments, the magnetic layer is located between the metal top layer 302 and antenna layer 312. The magnetic layer 306 is configured to enhance the magnetic flux of the card. The magnetic layer 306 is generally thinner than the metal top layer 302 and may range from about 0.05 mm to about 0.2 mm in thickness. In some further embodiments, the thickness of the magnetic layer 306 is from about 0.1 mm to about 0.15 mm, including about 0.12 mm. In some embodiments, the magnetic layer 306 is composed of ferrite. That is, the material includes iron (Fe) within the composition. In some embodiments, the magnetic layer is configured to protect the antenna from the metal layer. Generally, the higher the resistance of the metal the in the metal top layer 302, the less "shielding" is required by the magnetic layer 306. As an illustrative example, stainless steel cards need less shielding than an aluminum based card, and the magnetic layer 302 may be modified accordingly, e.g., modification by material and/or dimensions. The thickness discussed above and the arrangement of the magnetic layer 306 is sufficient to allow a chip module 120 to receive sufficient RF energy to activate when at least the side opposite the metal layer 302 is presented towards a card reader.

In some embodiments and as illustrated in the exemplary embodiment of FIG. 3, the magnetic layer 306 is sandwiched between two (2) thin adhesive layers 304 and 308. That is, adhesive layer 304 may adhere a first surface of the magnetic layer 306 to the bottom surface of the metal top layer 302 and adhesive layer 308 may adhere an opposite surface of the magnetic layer 306 to the rest of the card body 301. The adhesive of the adhesive layers is configured such that there is a sufficient bond between the magnetic layer 306 and metal layer 302 and other layers of the card body 301 that eliminates/minimizes delamination.

The adhesive layer is generally thinner than either the top metal layer 302 and magnetic layer 306. In some embodiments, the adhesive layer is has a thickness of about 25 µm to about 100 µm. In some further embodiments, the adhesive layers 304 and 308 have a thickness of about 50 µm. Each layer 304 and 308 may have the same thickness or have different thicknesses. In some further embodiments, the adhesive layers 304 and 308 may be provided as a sheet of material. The sheet form of the adhesive layers 304 and 308 may facilitate the manufacture of the card body 301.

In some embodiments, the adhesive layers 304 and 308 are composed of a thermoplastic adhesive, which softens upon heating and is solid at room temperature. Non-limiting examples of thermoplastic adhesive include hot-melt adhesive, ethylene-vinyl acetate (EVA), polyamides, polyesters, polyurethanes, and the like. In some embodiments, the adhesive layers 304 and 308 are configured to bond at temperatures between about 100 to about 200 degrees Celsius. In some embodiments, the adhesive layers 304 and 308 are hot melt type adhesive layers provided with an adhesive coating to facilitate tack and/or adhesion between adjacent layers.

In other embodiments, the adhesive layers 304 and 308 are composed of pressure sensitive adhesives (PSA). That is, the adhesive layers may include a non-reactive adhesive, which forms a bond when pressure is applied to bond the adhesive layer with a surface. Generally, no solvent or heat is needed to activate the adhesive and the bond is held at room temperature. In yet still other embodiments, the adhesive layers 304 and 308 include a chemical bonding agent such as glue or epoxy.

The card body 301 also includes an antenna card portion 311 located between the metal top layer and the bottom most layer of the card body 301, which as illustrated in FIG. 3 is the bottom overlay layer 318. In some further embodiments, the antenna platform 311 is located between the magnetic layer 306 and the thermoplastic layer 316. The antenna platform 311 may be composed of an antenna layer 312 sandwiched between two coated overlay layers 310 and 314. Generally, the antenna layer is connected to a microchip (such as chip module 120) that enables the card to pick up and respond to an activating signal (electromagnetic field including but not limited to radio waves) generated by a reader. The antenna layer 312 allows the transaction card 300 to exchange information and transact a payment without contact. Contactless chip card technology is based on two standards: ISO/IEC 14443 Type A and Type B (for proximity cards), and ISO/IEC 15693 (for vicinity cards). Cards that comply with these standards operate at the 13.56 MHz frequency. ISO/IEC 14443 products have a range of up to 10 cm (centimeters), while ISO/IEC 15693 products can operate at a range between 50 and 70 cm.

In some embodiments, a module, also known as a chip module is configured to inductively couple to the antenna for reception and transmission of data, e.g., payment information. The chip module 120 may include a single chip or may include multiple chips for computing and power management functions.

The antenna layer 312 is typically a geometric pattern of a metal wire in a single plane/sheet. The metal may be any suitable metal material however, aluminum is typically used. Others metals include but are not limited to copper, silver, magnesium, nickel, iron and combinations or alloys thereof. The antenna layer generally thinner than the top later 302 and has a thickness range of about 25 µm to about 100 µm. In some further embodiments, the thickness of the antenna layer 312 ranges from about 35 µm to about 60 µm. In still yet further embodiments, the antenna layer 312 is about 45 µm thick.

As described above the antenna layer 312 is typically available as an antenna platform 311 wherein the antenna layer 312 is sandwiched between two overlay layers 310 and 314. The overlay layers are made of a thermoplastic material and encapsulate and protect the antenna layer 312. In some embodiments, the thermoplastic material of the overlay layers is composed of PET and/or PVC. The overlay layers 310 and 314 also allow for the antenna layer 312 to bond to the card body 301. The overlay layers 310 and 314 may range in thickness from about 25 µm to about 100 µm. In some further embodiments, the overlay layers 310 and 314 may range in thickness from about 50 µm to about 75 µm. In yet still further embodiments, the overlay layers 310 and 314 are about 60 µm thick. The overlay layers 310 and 314 may be substantially identical in material in thickness or may each have different composition and thickness. In some embodiments, the overlay layers 310 and 314 further include an adhesive coating configured to adhere to and/or facilitate a bond to adjacent layers.

As also illustrated in the exemplary embodiment of FIG. 3, the card body 302 may also include a thermoplastic layer 316. In some embodiments, the thermoplastic layer 316 is the bottom most layer of the card body 301, i.e., the layer furthest away from the metal top layer 302. In some embodiments, and as illustrated, the thermoplastic layer 316 may further include an additional overlay layer 318. The thermoplastic layer 316 may be made of a polyvinyl chloride (PVC) material including polyvinyl chloride acetate (PVCA). In other embodiments, the thermoplastic layer 316 may be made of a Polyethylene terephthalate (PET) material. In yet still other embodiments, the thermoplastic layer 316 is made of a combination of materials, for example and without limitation, the layer 316 may be made of a combination of PVC and PET in various percentages by weight.

The thermoplastic layer 316 may have a thickness of about 0.10 mm to about 0.3 mm. In some further embodiments, the thermoplastic layer 316 may have a thickness from about 0.12 mm to about 0.2 mm. In yet still further embodiments, the thermoplastic layer 316 may have a thickness of about 0.15 mm. In some embodiments, the thermoplastic layer 316 includes graphical and/or textual content including but not limited to branding, colors, statements, warnings, phone numbers, etc. The thermoplastic layer 316 may also provide structural rigidity to the card body 301 such as adding resistance to flexing. The thermoplastic layer 316 may also be configured to bond to the antenna package 311 such that the antenna package is secured between the top metal layer 302 and the thermoplastic layer 316. In yet still further embodiments, the thermoplastic layer 316 may include a magnetic stripe configured to hold data/payment information.

In some embodiments, the card body 301 includes an overlay layer 318 on the bottom most surface of the adjacent thermoplastic layer 316. The overlay layer 318 is generally thinner than the thermoplastic layer 316 having a thickness of about 25 µm to about 50 µm. In some further embodiments, the overlay layer 318 has a thickness of about 40 µm. The overlay layer 318 may be transparent allowing for any printed content/graphics on the thermoplastic layer 316 to be visible. The overlay layer 318 may serve to provide a protective layer to the underlying thermoplastic layer 316. In yet still further embodiments, the overlay layer 318 may include a magnetic stripe configured to hold data/payment information.

Figure 4A:
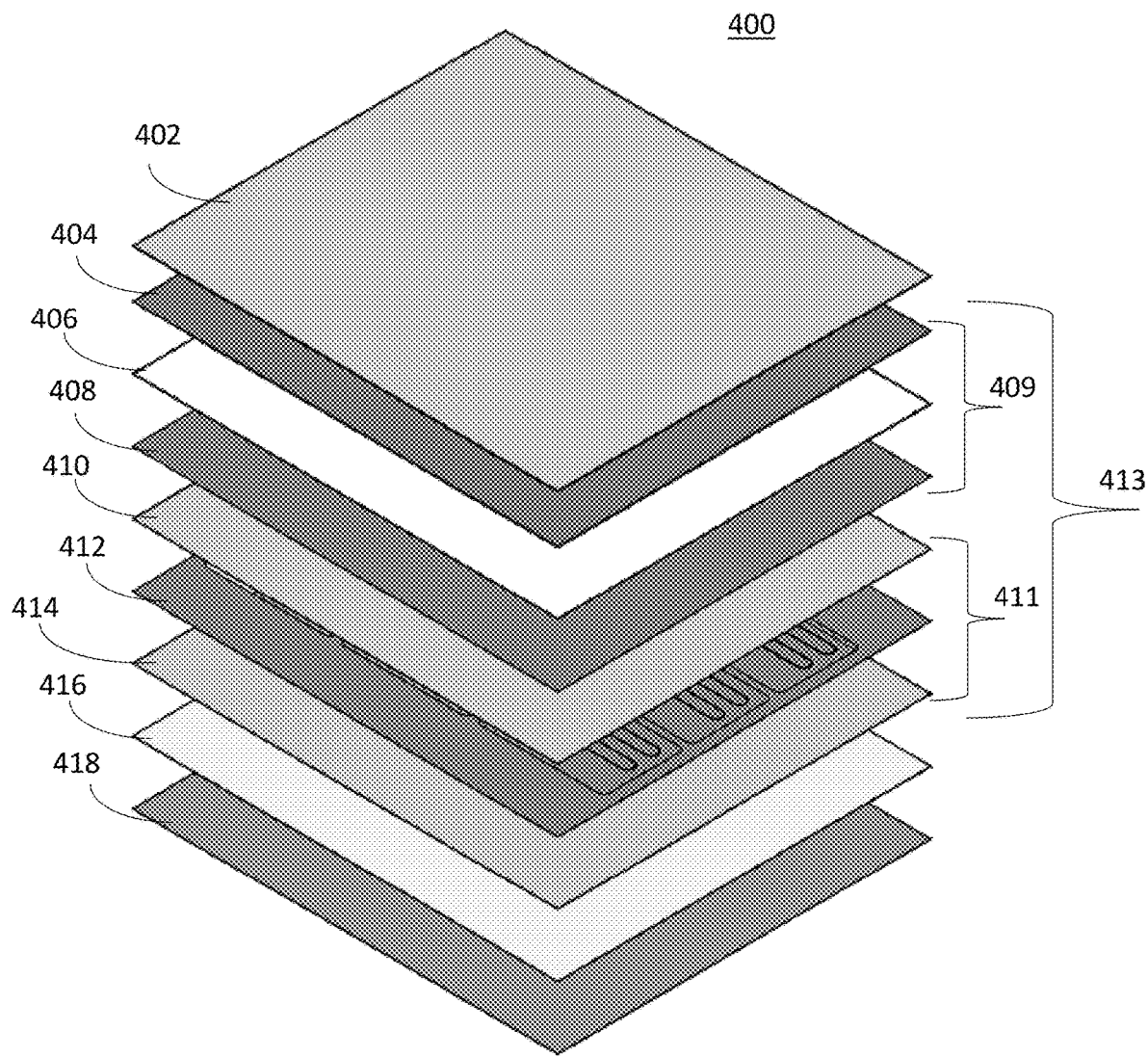
FIG. 4A is an exploded view of an exemplary stack of sheets for manufacturing the transaction card of FIG. 3.
Figure 4B:
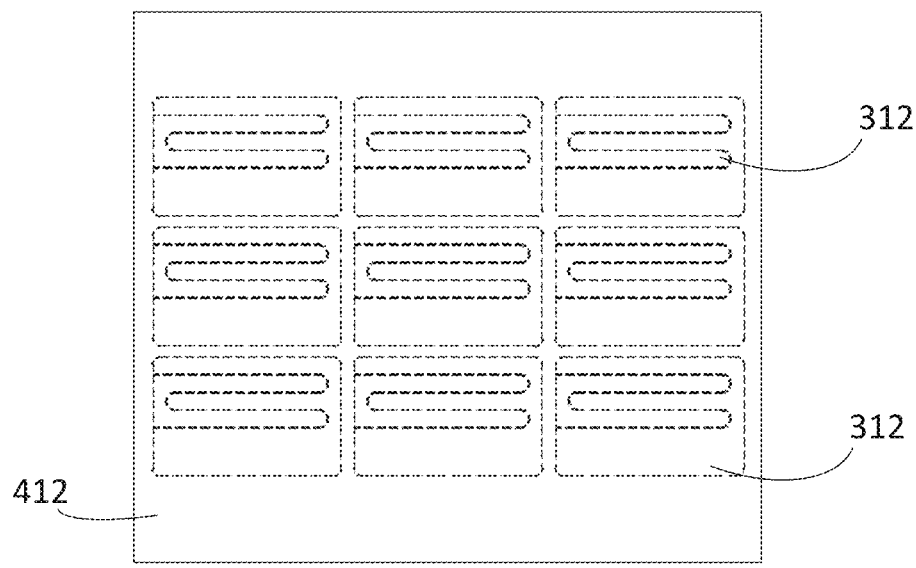
FIG. 4B is an exemplary antenna sheet in accordance with the present disclosure.
Figure 5:
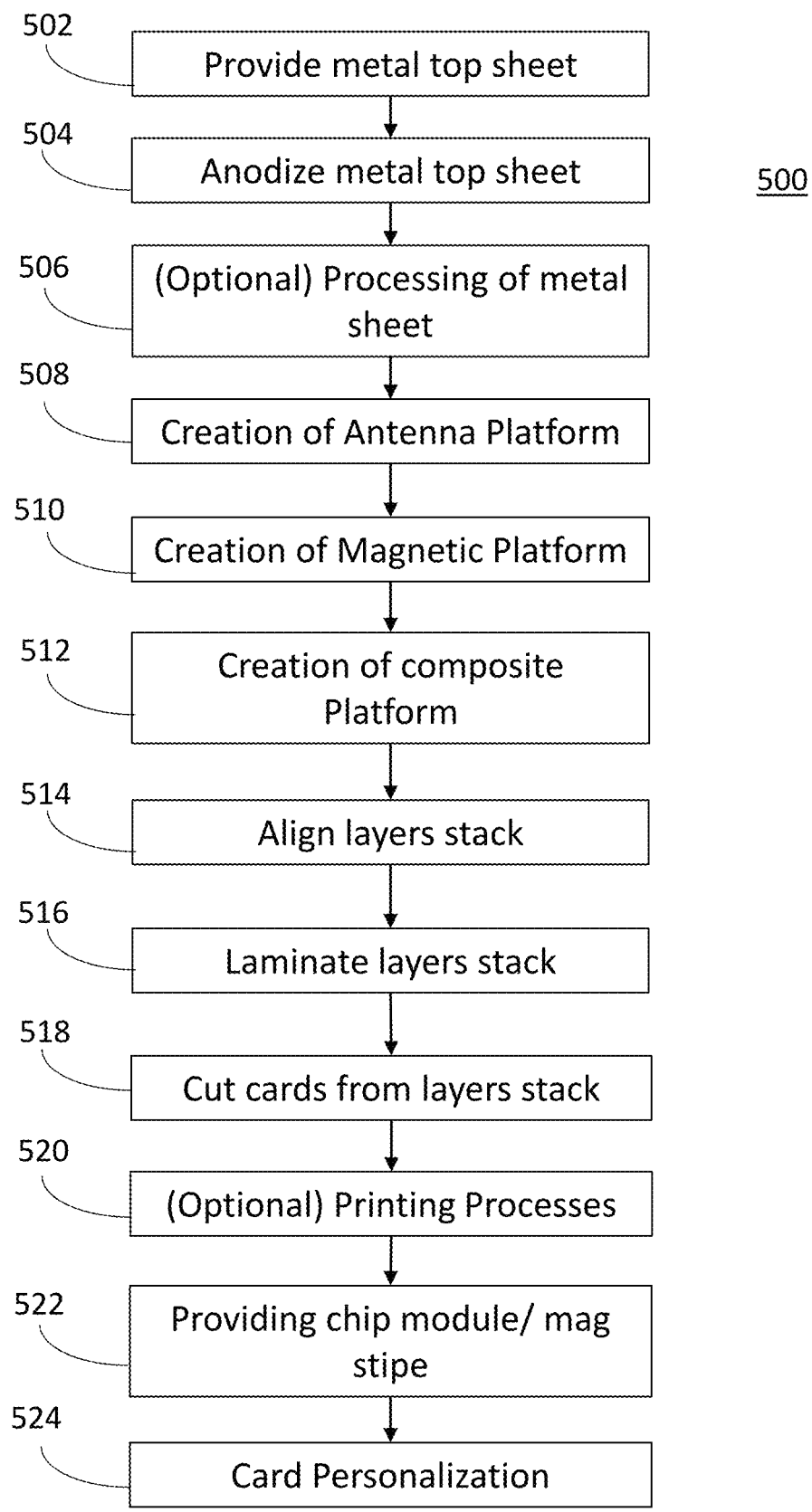
FIG. 5 is a block diagram on an exemplary method for manufacturing a transaction card in accordance with the present disclosure.

The card body, such as card body 102, 301 of transaction cards 100, 300, respectively may be formed via a variety of manufacturing techniques. In some exemplary embodiments, the manufacturing is a batch process (illustrated in Process 500 of FIG. 5) including processing sheets composed of a stack of layers, although bodies 301 may also be made on an individual processing basis. As illustrated in FIG. 4, a stack of sheets 400 from which at least one transaction card (e.g., card 300) may be manufactured includes a top metal sheet 402, adhesive sheets 404 and 408; a magnetic sheet 406, an antenna platform sheet 411, a thermoplastic sheet 416, and (optionally) an overlay sheet 418. Each sheet being similar in dimension and material as the corresponding card layer.

An exemplary process 500 for manufacturing a transaction card 300 includes, at block 502, providing a metal top sheet 402. The metal top sheet 402 be formed via a cutting process, stamping process or via a machining (e.g., milling) process. That is, a metal sheet is provided in either a coil form or a sheet of metal material may be cut from a coil of material, which are flattened and then cut into metal top sheets 402.

The exemplary process 500 for manufacturing a transaction card 300 also includes, at block 504, anodizing the metal top sheet 402. The metal top sheet 402 may be anodized via an anodizing process. In some embodiments, the entire sheet 402 is anodized. In other embodiments, the metal top sheet 402 is selectively anodized, e.g., one of the top or bottom surfaces of the metal top sheet 402 are anodized. In one example, the metal top sheet 402 is placed on an anodizing rack (not illustrated) and transported to an anodization line for subsequent processing as detailed below. Where an image is to be provided on the transaction cards 100, 300, the metal top sheet 402 may instead undergo an anodizing and sublimating image process, where the metal top sheet 402 is anodized and then images are provided thereon via sublimation printing. Thus, the anodizing and sublimating images on the metal top sheet 402 may include both an anodizing sub-step and an imaging or sublimation-printing sub-step.

Regardless of whether an image is to be sublimation-printed, the metal top sheet 402 may first undergo a cleaning operation. In some examples, the metal top sheet 402 is cleaned via phosphoric acid, however, other cleaning solutions may be utilized, for example, alkaline detergent formulations, inorganic acid or alkaline formations, organic acid formulations, $CO_2$ (i.e., dry ice), or $H_2O_2$, plasma cleaning. The cleaning operation may include a polishing treatment performed through a mechanical process (e.g., buffing), a chemical process (e.g., bright dipping), or an electrochemical process (e.g., electro-polishing), or combinations thereof. In examples where polishing is accomplished via the chemical process, the metal top sheet 402 may be bright dipped in a polishing formulation. Then, a recovery operation may be performed to capture dissolved metal (e.g., aluminum) from the phosphoric acid previously utilized to rinse the metal top sheet 402 during the cleaning operation and/or the polishing treatment. Here, used Phosphoric Acid may be recovered through counter-flow rinsing, where it is recycled via ion exchange and vacuum evaporation.

In some embodiments, a deoxidation operation may be performed on the metal top sheet 402 where the metal top sheet 402 is placed in an acid bath at room temperature to oxidize and remove metal precipitates that may have formed during the preceding polishing operation when the metal top sheet 402 was subject to bright-dipping or electro-polishing. Acid baths having various oxidation chemistries or formulas may be utilized in the deoxidation operation.

After a deoxidation operation, the metal top sheet 402 may be anodized, wherein such anodization operation forms an oxide layer on the metal top sheet 402. The oxide layer may have various thicknesses and, in some embodiments, the oxide layer may range in thickness from seven (7) to twenty-five (25) microns. In even other examples, the oxide layer may have a thickness ranging from ten (10) to twenty-five (25) microns, or even twelve (12) to twenty-five (25) microns. In some of these examples, the oxide layer ranges in thickness from fourteen (14) to twenty-five (25) microns. However, the oxide layer may have other thicknesses without departing from the present disclosure.

The metal top sheet 402 may be rinsed after the anodization operation to clean out the anodic pores previously formed on the metal top sheet 402. In one example, the metal top sheet 402 is subject to a standing rinse for three (3) minutes in a room temperature solution. Various solutions may be utilized for this standing rinse.

In embodiments where no image is to be sublimated onto the transaction card 100, 300 the anodizing of the metal top sheet 402 may then include a dying operation. Here, the metal top sheet 402 is dyed utilizing various anodizing dyestuffs. Then, the metal top sheet 402 may include a pre-sealing operation where the metal top sheet 402 is pre-sealed, for example, by dipping it in a tank containing nickel acetate for about three (3) to about six (6) minutes. However, the metal top sheet 402 may be dipped in tanks containing other metals or non-metals. After the pre-seal operation, the metal top sheet 402 may include a final sealing operation, where the metal top sheet 402 is further sealed, for example, by dipping it in a tank of deionized water for about three (3) to about ten (10) minutes. Thereafter, the metal top sheet 402 may undergo a drying operation. Here, the metal top sheet 402 is dried with forced air at a temperature ranging from about 220 degrees Fahrenheit (220° F.) to 275 degrees Fahrenheit (275° F.) and then removed from the anodizing line; however, different parameters may be utilized to dry the metal top sheet 402.

However, where an image is to be provided on the transaction card 100, 300 via sublimation technology, the metal top sheet 402 may instead undergo an anodizing and sublimating image on body step that includes an imaging sub-step. In the anodizing and sublimating image on body step, the dying operation and the pre-sealing operation may be skipped. Instead, immediately after the standing rinse operation described above, the anodizing and sublimating image on body step may rinsed in deionized water and dried. After drying, the metal top sheet 402 may be moved from the anodizing line to an imaging line where the metal top sheet 402 is subject to an imaging operation. In the imaging operation, sublimation printing paper (hereinafter, "paper") is placed in a printer and an image is printed on the paper. The paper having the printed image (hereinafter, "printed paper") may then be cut to size and register holes may be formed therein, for example, via laser cutting. In other examples, the printed paper is mechanically cut to size and punched with register holes.

In some embodiments, for example, at block 506, the top metal sheet includes additional processing, for example, at least one pocket 302 configured to receive a chip module 120 may be formed in the metal top sheet 402. In some embodiments, the optional processing may include, using a milling machine to mill the pocket for the chip module 120 prior to laminating the layers of the stack 400. In order for correct placement of the at least one pockets 302 the metal top sheet 402 is registered with a milling machine. In some embodiments, the at least one pocket provided thereon aids in alignment of the top sheet 402 with the remaining sheets of the stack 400.

Figure 6:
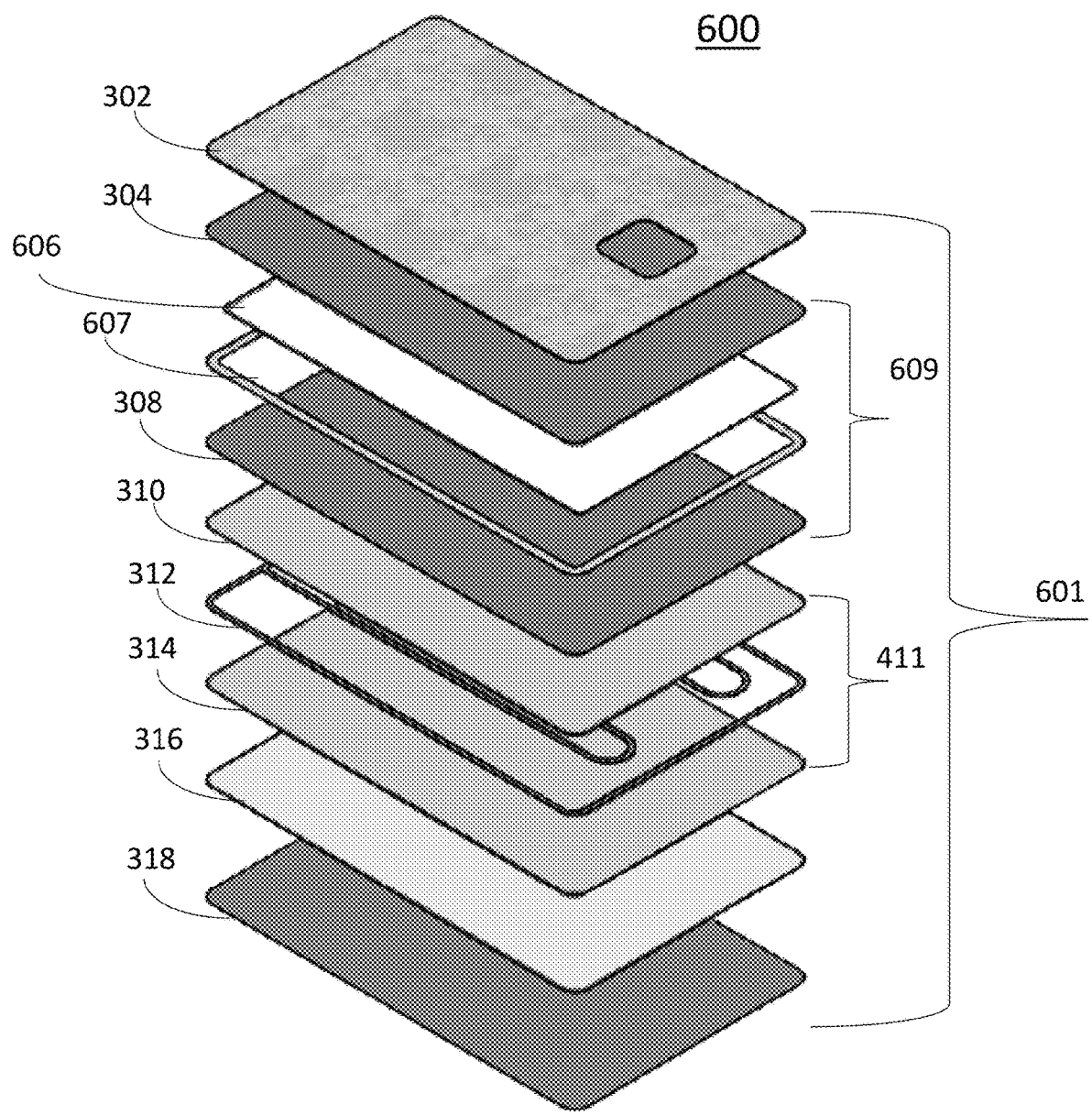
FIG. 6 is an exploded view of another exemplary transaction card in accordance with one or more embodiments of the present disclosure.

The exemplary process 500 for manufacturing a transaction card 300 also includes, at block 508, a sub process of manufacturing an antenna platform sheet 411. The antenna platform sheet 411 is similar to antenna package 311 and best understood with respect thereto. The antenna platform sheet 411 includes providing an antenna sheet 412 illustrated in FIGS. 4 and 6 including at least one antenna layer 312. An exemplary antenna sheet 412 including nine antenna layers 312 (arranged in a 3×3 pattern) is illustrated in FIG. 6. It is to be understood that the number of antenna layers 312 in an antenna sheet 412 is not limiting and that sheets of various sizes and numbers of antenna layers 312 may be used without departing from the scope of this disclosure.

The antenna platform sheet 411 includes the antenna sheet 412 sandwiched between two overlay sheets 410 and 414 that correspond to overlay layers 310 and 314 of the card body 301. In some embodiments, the sheets 410, 412, 414 of the antenna platform sheet 411 is held together via at least one tack bond (not illustrated). That is, heat is applied at specific point locations over the sheet area such that the thermoplastic material of the overlay sheets 410 and 416 bond together with the antenna sheet 412 sandwiched therebetween. For example, sheets 410, 412, 414 may be tacked together around the edges with heat. In other embodiments, sheets 410, 412, 414 are tacked together via ultrasonic welding. In yet still other embodiments, an adhesive, such as an adhesive coating on the overlay sheets is used to tack together the overlay sheets 410 and 414 with the antenna sheet 412.

In some embodiments, the exemplary process 500 for manufacturing a transaction card 300 also includes, at block 510, a sub process of manufacturing a magnetic platform sheet 409. The magnetic platform sheet 409 corresponds to magnetic layer 306 and adhesive layers 304 and 308, i.e., having a magnetic sheet 406 and adjacent adhesive sheets 404 and 408. Like the antenna platform sheet 411, the magnetic platform sheet 409 may be tacked together to hold sheets 404, 406, and 408 together. That is, heat may be applied at specific point locations over the sheet area such that the adhesive/thermoplastic material of the adhesive sheets 304 and 408 bond together with the magnetic sheet 406 sandwiched therebetween. In other embodiments, sheets 404, 406, and 408 are tacked together via ultrasonic welding. In yet still other embodiments, an adhesive, such as an adhesive coating on the overlay sheets is used to tack together the sheets 404, 406, and 408.

In some embodiments, the exemplary process 500 for manufacturing a transaction card 300 also includes, at block 512, a sub process of manufacturing a composite platform sheet 413. Here, the composite platform sheet 413 includes the layers of the magnetic platform sheet 409 and the layers of the antenna platform sheet 411. Each of the magnetic platform sheet 409 and antenna platform sheet 411 may be separately formed and then tacked together in a similar manner, e.g., by light heat treatment, spot tacking, ultrasonic welding, or adhesive.

In other embodiments, the layers of the magnetic platform sheet 409 and the layers of the antenna platform sheet 411 are not separately tacked and rather than the creation of an antenna platform sheet 411 and magnetic platform sheet 409, a composite platform sheet 413 is formed. Here, the magnetic sheet 406 is sandwiched between adhesive layers 404 and 408 and the antenna sheet 412 is sandwiched between overlay sheets 410 and 414. Sheets 404, 406, 408, 410, 412, and 414, are aligned and tacked together, prohibiting relative movement therefore. Tacking includes but is not limited to light heat treatment, spot tacking, ultrasonic welding, or use of an adhesive The exemplary process 500 for manufacturing a transaction card 300 also includes, at block 514, aligning the layers of the stack of sheets 400 before lamination. Here, the composite platform 413 may be aligned with the metal top sheet 402 and thermoplastic sheet 416, and overlay sheet 418 (if desired). Although the bottom overlay sheet 418 may be pre-adhered to the thermoplastic sheet 416 through known method. Alignment may be performed optically, mechanically, magnetically or through a combination thereof. For example, each layer may include a plurality of registration marks and/or may include a plurality of apertures (not illustrated) that drop over a set of pins. In this way, any images printed on the top sheet 402 are aligned with the antenna layers 312 such that when cards 300 are cut from the laminated sheet, a functional card body 301 is formed.

After the layers are aligned, the exemplary process 500 for manufacturing a transaction card 300 also includes, at block 516, a lamination process the bonds layers of the stack of sheets 400 together. This may include placing the aligned stack of sheets in a heat press that maintains registration of the sheets and provides heat sufficient to bond the adhesive and thermoplastic layers together. In some embodiments, the aligned stack of sheets 400 in the lamination operation 516 is subject to a combination of heat and pressure. The heat applied is configured to melt the thermoplastic and adhesive layers to form a substantially rigid stack of sheets. Heat applied may range from about 100 degrees Celsius to about 170 degrees Celsius. The stack of sheets may also be subject to pressures ranging from about 30 Psi to about 300 psi.

As an illustrative example, the stack of sheets may be subject to various heat and pressure cycles. Including the following:

| Example 1 | Cycle 1 | Cycle 2 | Cycle 3 | Cycle 4 | Cycle 5 |
|---|---|---|---|---|---|
| Temperature [Celsius] | 100 | 120 | 140 | 160 | 150 |
| Time [Sec] | 10 | 10 | 30 | 40 | |
| Pressure [PSI] | 45 | 80 | 90 | 250 | 250 |

| Example 2 | Cycle 1 | Cycle 2 | Cycle 3 | Cycle 4 | Cycle 5 |
|---|---|---|---|---|---|
| Temperature [Celsius] | 100 | 120 | 150 | 170 | 150 |
| Time [Sec] | 10 | 10 | 40 | 60 | |
| Pressure [PSI] | 45 | 80 | 90 | 190 | 190 |

The heat applied may include a heat ramp rate of about 30 degrees Celsius per second to about 50 degrees Celsius per second. In some embodiments, the heat applied may include a heat ramp rate of about 40 degrees Celsius per second. The lamination operation may also include a cooling cycle where the temperature is lowered from its final cycle temperature to about room temperature at a controlled rate. In some embodiments, the cooling cycle ramps the temperature down to room temperature (about 30 degrees Celsius) at a rate of about 0.2 to about 0.4 degrees per second including about 0.3 degrees per second. For example and without limitation a cycle temperature of 150 degrees Celsius may be cooled to about 30 degrees Celsius in about seven minutes. The rates of heating and cooling are controlled in order to obtain a desired adhesion such that the card is able to pass the ISO Peel test. Control of the rates of heating and cooling also minimizes the creation of "laking", i.e., large bubbles formed between adjacent layers.

After the laminated stack of sheets 400 is cooled, transaction cards may be removed from the laminated stack of sheets at block 518. This may include transferring the laminated stack of sheets 400 to a milling or stamping machine and registering the laminated stack of sheets 400 thereto.

Transaction cards 300 may be formed for example, via stamping, where one or more of the card bodies 301 are stamped from a stack of sheets 400. When formed by stamping, however, the card bodies 301 may have a square (or ninety degree (90°)) edge extending along a periphery thereof. These square edges may include burrs or other sharp, jagged or rough surfaces, which may be undesirable for a particular end-use application. Therefore, the square edges may be machined after stamping (i.e., finishing) to remove burrs or other sharp, jagged or rough surfaces. For example, a cutting tool may be utilized to machine the square edges of the card body 301 and remove such burrs or other sharp, jagged or rough surfaces. In some embodiments, the cutting tool is configured to machine a non-square edge into the card body 301 as described below. Thus, cutting tools may be utilized to de-burr the square edges of the card body 301 and, in some embodiments, the cutting tools are configured to also machine the square edges into non-square edges. While finishing the square edges in this manner to remove burrs involves an additional operation, it may nevertheless be desirable in end-use applications where burrs are undesirable, for example, where the transaction card 300 is to be frequently handled by the end-user. In addition, finishing the square edges into non-square edges may inhibit delamination of the transaction cards 300 in embodiments, for example, where one or more overlays are laminated on the card body 301. Moreover, where the transaction cards 300 are manufactured with metallic materials, the square edge may reveal a metallic color of the card body 301, which may be visually unappealing and difficult to conceal via subsequent processing.

Alternatively, at block 518, the transaction cards, 100, 300 disclosed herein may be manufactured via milling, for example, where the card bodies 301 are individually machined from the laminated stack of sheets 400. Various types of milling equipment may be utilized to mill the transaction cards 300 such as a computer numerical controlled ("CNC") precision mill. Also, various cutting tools may be utilized to mill the card body 301. In some examples, the cutting tools are configured to cut a square edge in the card body 301 whereas, in other embodiments, the cutting tools are configured to cut a non-square edge, for example and without limitation, the cutting tools may cut a beveled edge.

Optionally, at block 518, pockets 303 may be milled from the stack of sheets 400. The pocket 303 formation at block 518 may be preferable to pocket formation at block 506 since the stack of sheets will be aligned with the cutting machine (e.g., CNC milling machine) and all layers in substantial alignment. Furthermore, a cutting machine, such as a CNC milling machine may be configured to mill the pocket to a certain depth of the card body and may penetrate further than just the metal top layer 302 as desired. For example and without limitation, the cutting machine may mill a pocket 303 through the metal top sheet 402 and magnetic layer 406 including layers/sheets therebetween. In some embodiments, the cutting machine is configured to mill a pocket 303 having multiple height ledges configured to receive a chip module 120.

Optionally, and if desired, at block 520 cut transaction cards 300 may be further processed including printing on either the metal top layer 302 or bottom most layer 316, 318 depending on configuration. Printing may include but is not limited to branding.

After removal of the card 300 from the laminated stack 400 and milling of the pocket 303, a chip module 120 may be implanted in the pocket 303 at block 522. The implantation is such that the chip module 120 is inductively coupled to the antenna of the antenna layer 312—allowing for contactless transactions with a card reader.

In some embodiments block 518 includes the providing a magnetic stripe. This may include laminating an overlay on the card body 301, e.g., an additional lamination process. As noted above, during the lamination at block 516 the overlay layer 318 is optional. The overlay 318 may include one or more features integral therewith, or such features may be topically applied to the overlay after the overlay has been applied to the card body 102. The overlays may be laminated to the card body 301 via a variety of laminating processes. For example, the card body 301 may be arranged in a planishing press with one or more preregistered overlays arranged on the front face and/or the rear face of the card body 301, and then pressed together within the planishing press. In some embodiments, a mag stripe slot is not milled in the card body 301 (as described below). Rather, the magnetic stripe may be topically applied to the overlay 318 via an adhesive. In other embodiments, however, the magnetic stripe is integral with the overlay 318 such that the magnetic stripe is applied to the card body 301 during lamination of the overlay 318 on the card body 301; and in these examples, the overlay 310 may also include other features, such as a hologram.

In some embodiments, a mag stripe slot (not illustrated) may be milled into a rear face of a card body during the providing mag stripe, chip module, bock 522. Here, the mag stripe slot is milled first, but it may instead be milled after milling of the chip pocket 303. The magnetic stripe may be installed within the mag stripe slot after milling the mag stripe slot. In some embodiments, an overlay that integrally includes the magnetic stripe is laminated into the mag stripe slot. However, in other examples, an overlay (that does not integrally include the magnetic stripe) may be laminated in the mag stripe slot after milling the mag stripe slot and/or milling the chip pocket and then the magnetic stripe may be adhered to that overlay. In even other embodiments, the magnetic stripe is adhered directly (i.e., without an overlay) within the mag stripe slot with an adhesive. The chip module 120 may be installed in the chip pocket 303 at this time (before or after), or the chip pocket 303 may remain empty for subsequent installation by an end-user. In addition, a hologram (not illustrated) may be applied to the card body 301 before or after installation of the magnetic stripe. In some examples, an overlay is laminated to the card body and then the hologram is applied thereto; whereas, in other embodiments, the hologram is integral with an overlay that is laminated to the card body. The hologram may be installed before or after the magnetic stripe.

In some embodiments, at block 524, the transaction card is personalized. Personalization may include laser decorating. Here, various information may be applied by laser, for example a card number, a name, brand information, or other information, etc. In addition, the laser may be utilized to provide various decoration, for example, where the transaction card 300 is to be used as a loyalty card or gift card. The foregoing information and/or decoration may be provided on a front face and/or the rear face of the card 300. However, it is to be appreciated that personalization may be skipped all together. Utilizing lasers to decorate and/or personalize the transaction cards 300 as described herein may be beneficial in that it may provide a three-dimensional surface finish that has a tactile sensation in many circumstances. In addition, laser decorating may be performed before the card body 301 is anodized, for example, immediately after creating the card body form. For example, the surface of the card may be disrupted with a laser such that the surface of the card has a tactile sensation, which may be beneficial for displaying a logo on the transaction card 300.

It is to be appreciated that some the foregoing blocks are optional and, depending on the particular end-use application, may be skipped and/or performed in a different order. For example, the laser decorating and/or the personalizing and/or additional decorating step may be skipped. Additionally, some the foregoing steps may include one or more sub-steps, and some of these sub-steps may be skipped depending on the particular end-use application. For example, in the providing a mag stripe overlay, chip, and/or hologram 340, a sub-step of installing the chip module 120 may be skipped.

Figure 7:
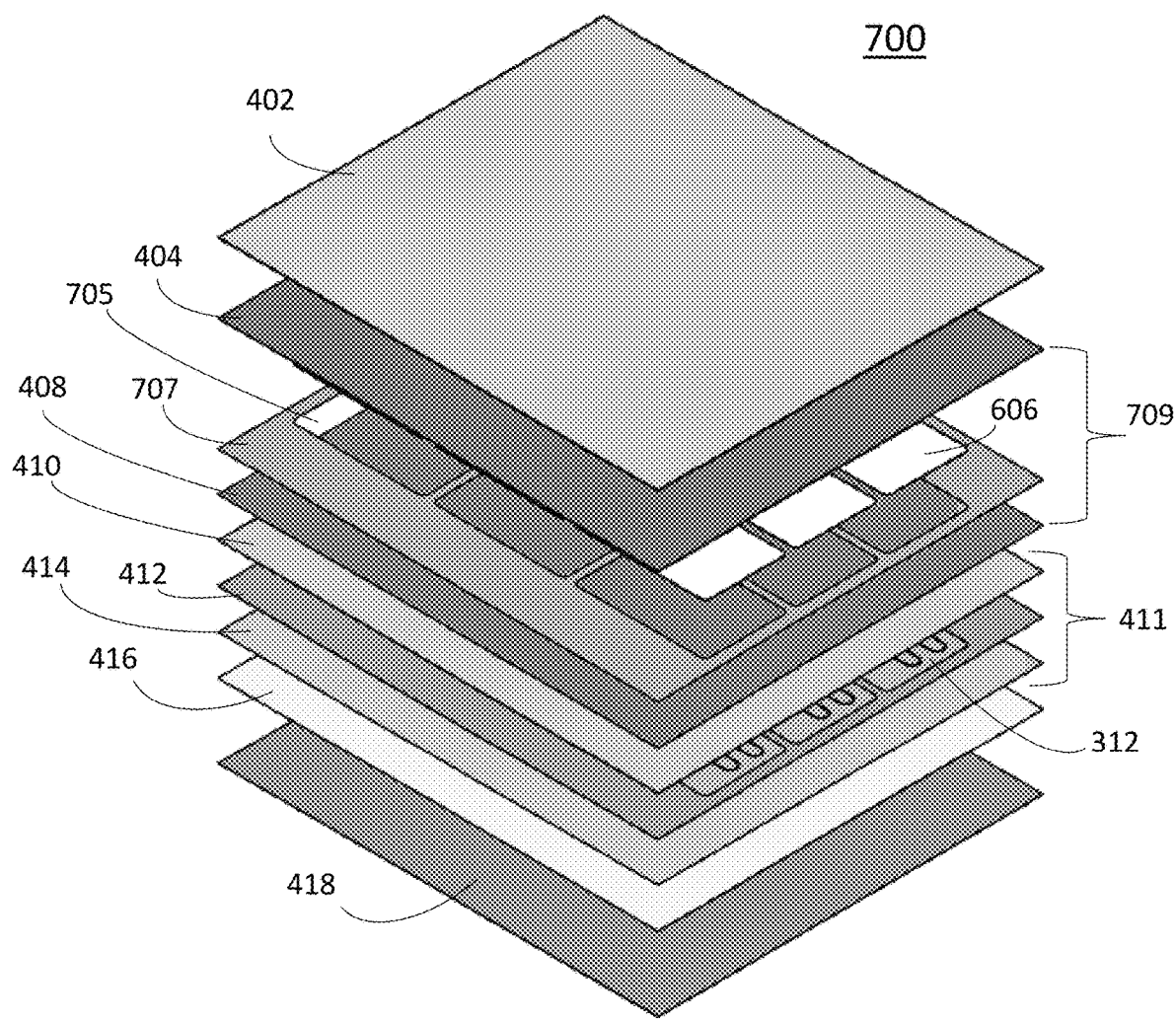
FIG. 7 is an exploded view of another stack of sheets for manufacturing the transaction card of FIG. 6.

FIGS. 6 and 7 illustrate another exemplary embodiment of a transaction card 700 and stack of layers 800 in accordance with the present disclosure. The layers of the card 400 and sheets in the stack 400 are similar to the layers of card 300 and stack 400 and best understood with reference thereto with the exception of the magnetic platform 609 described in greater detail below. That is, the transaction card 700 includes card body 701 having adhesive layers 304 and 308, an antenna layer 312, antenna overlays 310 and 314, a thermoplastic layer 316, and in some embodiments an overlay layer 318, each layer described in greater detail with respect to FIG. 3. Likewise, the layers stack 700 includes a stack of sheets from which at least one transaction card (e.g., card 600) may be manufactured. The layers stack 700 including: a top metal sheet 402, adhesive sheets 404 and 408, an antenna platform sheet 411 (composed of an antenna sheet 412 sandwiched between two overlay layers 410 and 416), a thermoplastic sheet 416, and (optionally) an overlay sheet 418. The layers stack 700 also includes a magnetic platform sheet 709 described in greater detail below. Each sheet being similar in dimension and material as the corresponding card layer.

As illustrated in FIG. 8, the top metal sheet 402 is aligned and paired with a skeleton sheet 707. The skeleton sheet 707 includes at least one card shaped cutout 705, the cutout 705 sized and configured to receive and position a magnetic layer 606. In this way, multiple card shaped magnetic layers 606 (magnetic cards) may be placed for alignment with antennas 312 of antenna sheet 412.

The skeleton layer 607 may be composed of a thermoplastic material, for example and without limitation PVC, and may have a thickness similar to the thickness of the magnetic layer 606 as described in greater detail with respect to magnetic layer 306. Alignment may be facilitated with markings (not illustrated) so that other sheets include card body layers and/or printed graphics may be aligned to produce a functional card body 601.

The skeleton sheet 707 with magnetic layers 606 is sandwiched between a pair of adhesive sheets 404 and 408. The adhesive sheets 404 and 408 corresponding to card layers 304 and 308, respectively and best understood with reference thereto. In some embodiments, the skeleton sheet 707, magnetic layers 606 and adhesive layers 404 and 408 are tacked together in a magnetic package sheet 609. That is, the adhesive layers 404 and 408 aid in maintaining the at least one magnetic layer 606 within the cutout 705 of the skeleton sheet 607. In some embodiments, wherein the adhesive sheets 404 and 408 are thermally active and or are coated with an adhesive coating, the skeleton sheet 707, magnetic layers 606 and adhesive layers 404 and 408 are tacked together with application of some heat and/or via ultrasonic welding.

Processing of the stack of layers 700 in forming a transaction card 600 may be similar to the processing of stack layers 400 as illustrated in the block diagram 500. Here, the difference is that the magnetic platform sheet 409 is replaced with the magnetic platform sheet 709 including a skeleton layer sheet 707. The skeleton layer sheet 707 including at least one cutout 705 for spacing at least one magnetic card 606 within the platform sheet 709 and for alignment with at least one antenna 312. The thermoplastic material of the skeleton layer 707 may also facilitate bonding of the stack of layers 600, and in particular, the layers/sheets composing the magnetic platform 609/platform sheet 709.

When a layers stack 700 is processed according to block 518, i.e., where the card form is cut from the laminated sheet stack 700, the resulting card body 601 includes a thermoplastic layer 607 that surrounds the magnetic card 606. This provides a desirable look and feel to the card as the magnetic layer 606 is not exposed. The thermoplastic layer, capable of thermally bonding to adjacent layers, also prevents unwanted delamination of the magnetic layer 606. In other words, the magnetic card layer 606 is generally smaller in area than the transaction card 600 allowing for a thermoplastic perimeter layer 607 to be cut from the skeleton sheet 707.

Therefore, the disclosed systems and methods are well adapted to attain the ends and advantages mentioned as well as those that are inherent therein. The particular embodiments disclosed above are illustrative only, as the teachings of the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope of the present disclosure. The systems and methods illustratively disclosed herein may suitably be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. In addition, the terms in the claims have their plain, ordinary meaning unless otherwise explicitly and clearly defined by the patentee. Moreover, the indefinite articles "a" or "an," as used in the claims, are defined herein to mean one or more than one of the elements that it introduces. If there is any conflict in the usages of a word or term in this specification and one or more patent or other documents that may be incorporated herein by reference, the definitions that are consistent with this specification should be adopted.

The use of directional terms such as above, below, upper, lower, upward, downward, left, right, and the like are used in relation to the illustrative embodiments as they are depicted in the figures, the upward or upper direction being toward the top of the corresponding figure and the downward or lower direction being toward the bottom of the corresponding figure.

As used herein, the phrase "at least one of" preceding a series of items, with the terms "and" or "or" to separate any of the items, modifies the list as a whole, rather than each member of the list (i.e., each item). The phrase "at least one of" allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

To aid the Patent Office and any readers of this application and any resulting patent in interpreting the claims appended hereto, applicants do not intend any of the appended claims or claim elements to invoke 35 U.S.C. 112(f) unless the words "means for" or "step for" are explicitly used in the particular claim.

What is claimed is:

1. A transaction card configured for contactless and contact transactions, comprising:
    a top metal layer having an upper surface and a bottom surface;
    a magnetic platform comprising:
        a magnetic layer having an upper surface, a bottom surface, and a periphery extending between the bottom surface and the upper surface of the magnetic layer,
        a thermoplastic perimeter layer surrounding the periphery of the magnetic layer,
        a first adhesive layer adhering the upper surface of the magnetic layer to the bottom surface of the top metal layer, and
        a second adhesive layer adhering to the bottom surface of the magnetic layer;
    an antenna package layer adhering to the second adhesive layer; and
    a thermoplastic layer having an upper side and a lower side, the upper side of the thermoplastic layer adhering to a side of the antenna package opposite the second adhesive layer.

2. The transaction card according to claim 1, wherein the antenna package layer includes an antenna layer sandwiched between two thermoplastic overlay layers.

3. The transaction card according to claim 1, wherein the metal layer has a conductivity greater than 10 million Siemens/meter.

4. The transaction card according to claim 1, wherein the metal layer is aluminum.

5. The transaction card according to claim 1, wherein metal layer has a yield strength between 40 and 60 ksi.

6. The transaction card according to claim 1, further comprising a chip module in electronic communication with the antenna layer and configured to receive an activating radio frequency energy.

7. The transaction card according to claim 1, further comprising a bottom overlay layer disposed on the lower side of the thermoplastic layer, wherein the bottom overlay layer comprises a magnetic stripe.

8. The transaction card according to claim 1, further comprising a bottom overlay layer disposed on the lower side of the thermoplastic layer, wherein the bottom overlay layer is transparent.

9. The transaction card according to claim 8, wherein thermoplastic layer comprises a graphic that is visible through the bottom overlay layer.

10. The transaction card according to claim 1, further comprising a bottom overlay layer disposed on the lower side of the thermoplastic layer, wherein the bottom overlay layer is thinner than the thermoplastic layer.

\* \* \* \* \*